A. ANDERSON.
CONVEYER BELT CARRIER AND TIGHTENING DEVICE FOR BELTS THEREON.
APPLICATION FILED SEPT. 17, 1915.

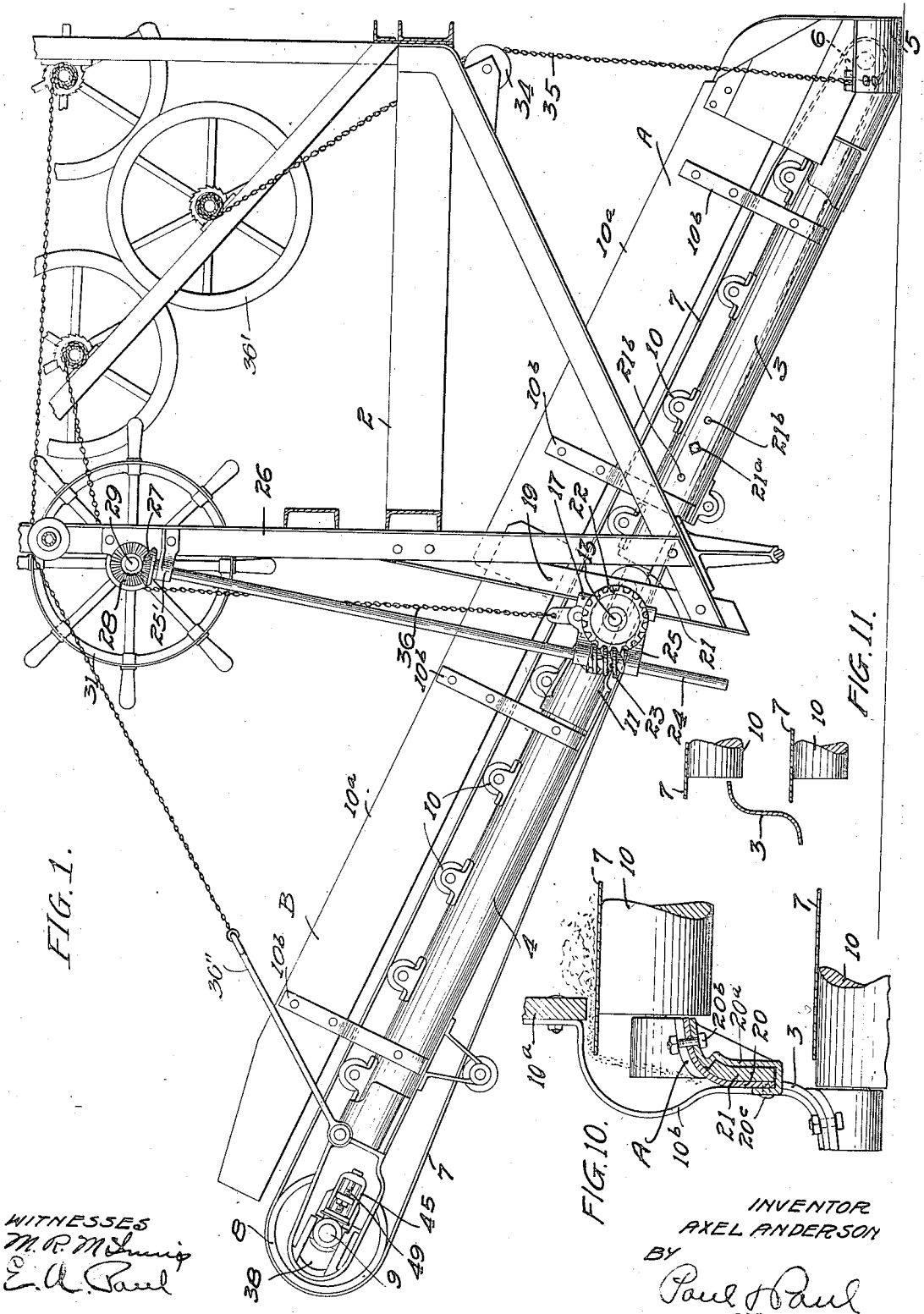

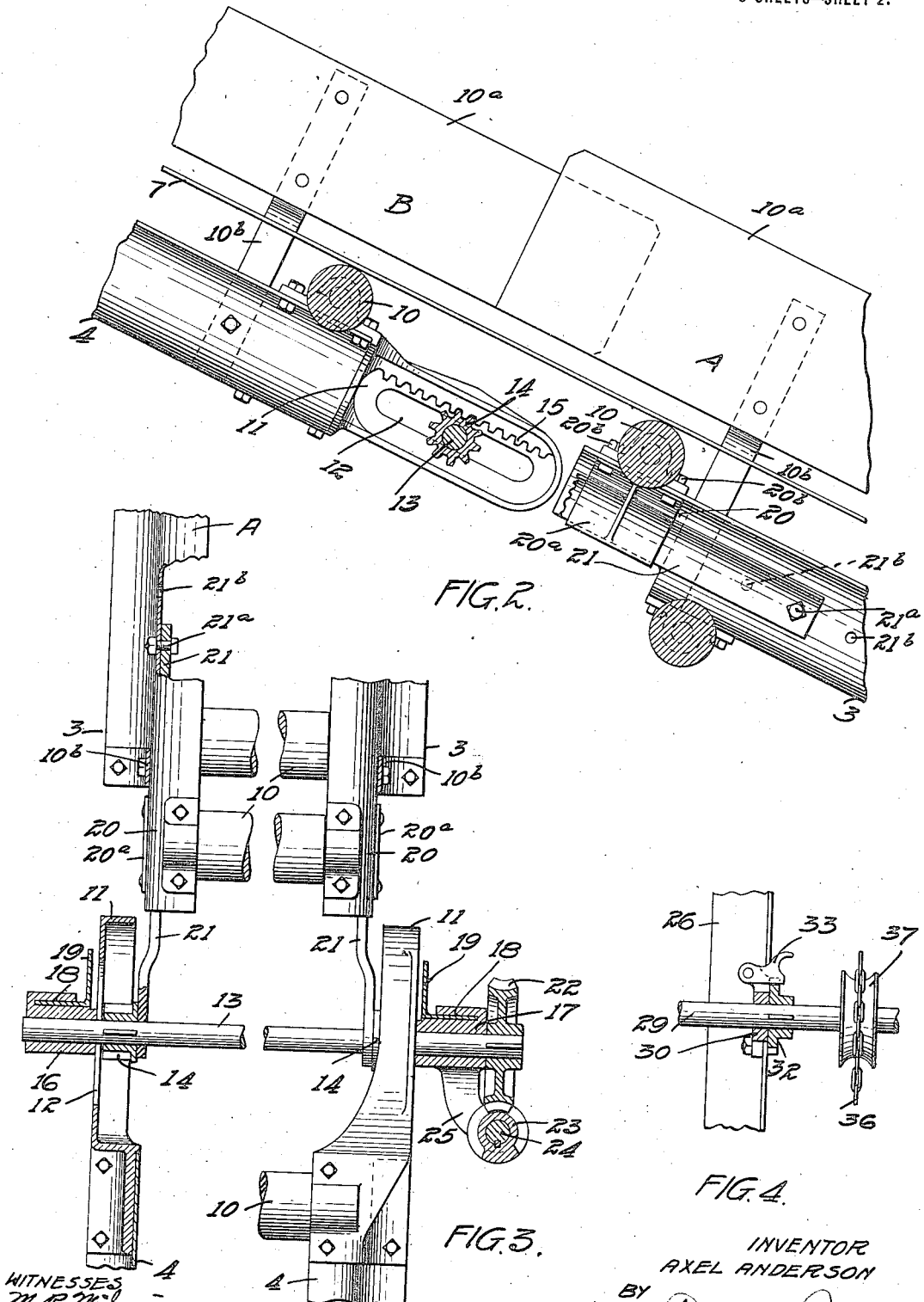

1,254,014.

Patented Jan. 22, 1918.
3 SHEETS—SHEET 3.

WITNESSES
M. R. McInnis
E. A. Paul

INVENTOR
AXEL ANDERSON
BY
Paul & Paul
ATTORNEYS

UNITED STATES PATENT OFFICE.

AXEL ANDERSON, OF ST. PAUL, MINNESOTA, ASSIGNOR TO RUSSELL GRADER MANUFACTURING COMPANY, OF MINNEAPOLIS, MINNESOTA.

CONVEYER-BELT CARRIER AND TIGHTENING DEVICE FOR BELTS THEREON.

1,254,014.

Specification of Letters Patent. Patented Jan. 22, 1918.

Application filed September 17, 1915. Serial No. 51,262.

*To all whom it may concern:*

Be it known that I, AXEL ANDERSON, a citizen of the United States, and resident of St. Paul, in the county of Ramsey and State of Minnesota, have invented certain new and useful Improvements in Conveyer-Belt Carriers and Tightening Devices for Belts Thereon, of which the following is a specification.

This invention relates to improvements in elevating graders and particularly to the conveyer belt carriers and the means for tightening the belts on such carriers in machines of this type.

The object of the invention is to provide means by which the operator, standing on the machine platform, can easily and quickly take up the slack in the carrier-belt or can loosen said belt while the machine is in motion.

Another object of the invention is to provide a carrier frame from which any material that escapes over the edges of the upper stretch of the carrier belt will be guided onto the ground and prevented from falling upon the other stretch of the belt.

Another object of the invention is to provide means in connection with the above identified mechanism for adjusting the upper roller of the carrier to aline the carrier belt on the roller.

The invention consists generally in the constructions and combinations hereinafter described and particularly pointed out in the claims.

Figure 5:
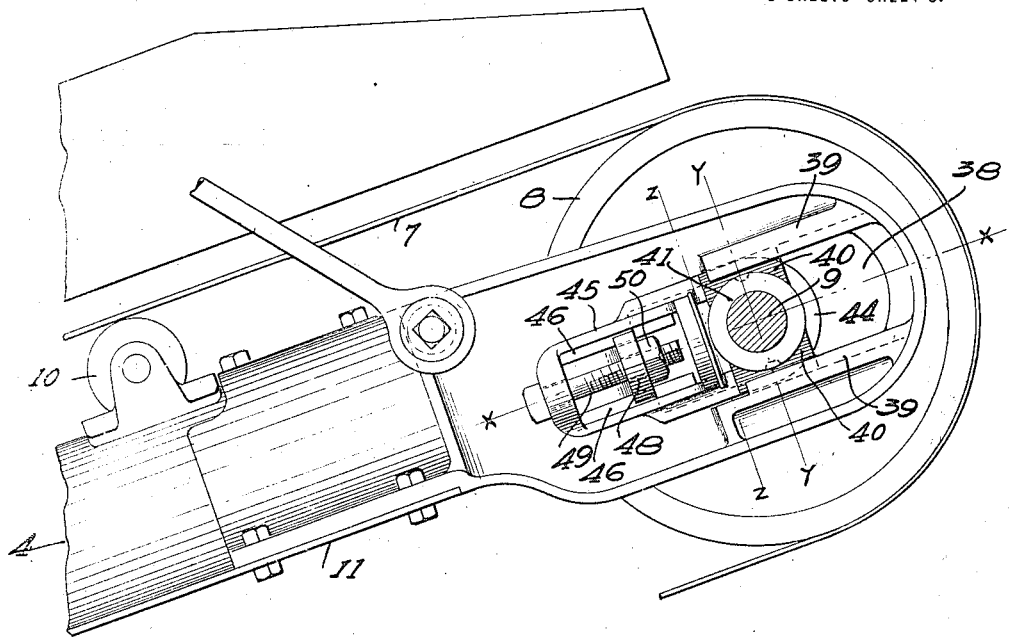
Figure 6:
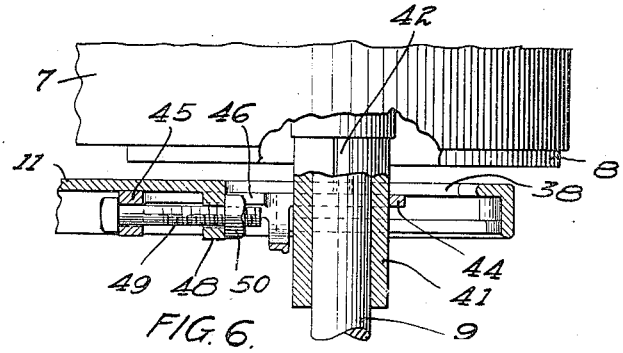
Figure 7:
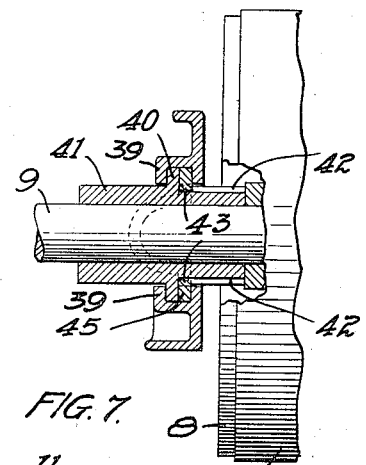
Figure 9:
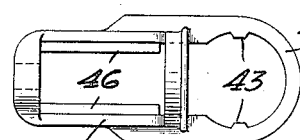
Figure 8:
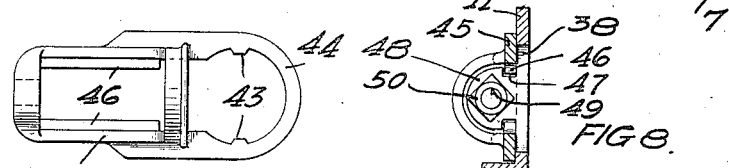

In the accompanying drawings forming part of this specification,

Figure 1 is a transverse sectional view through a portion of the frame of a grading machine, showing the elevating carrier in side elevation, Fig. 2 is a detail view, partly in section illustrating the expansible connection between the upper and lower carrier section, Fig. 3 is a plan view partly in section and partly broken away, showing the connection between the upper and lower sections of the carrier frame and the adjusting mechanism, Fig. 4 is a detail showing the device for locking the shaft and wheel that control the tightening mechanism, Fig. 5 is a detail elevation partly in section illustrating the means provided at the upper end of the carrier for adjusting the upper roller shaft, Fig. 6 is a detail sectional view on line x—x of Fig. 5, Fig. 7 is a similar view on line y—y of Fig. 5, Fig. 8 is a sectional view on line z—z of Fig. 5, Fig. 9 is a detail view showing the carrier or frame in which the adjusting bolt of the upper roller adjusting mechanism is mounted, Fig. 10 is a detail section illustrating the construction of the frame of the carrier and the relation of the carrier rolls and belts thereto, Fig. 11 is a similar view on a smaller scale taken at a point either above or below the connection between the carrier sections.

In the drawings, 2 represents a portion of the frame of the machine, which may be of any suitable size and construction, and which will be preferably mounted upon suitable supporting wheels and provided with suitable propelling means, or with means for attaching a team or a tractor to said mechanism for moving the same as desired. The carrier frame consists of an upper section and a lower section. I have indicated in the drawings the lower section, as a whole, by the reference letter A, and the upper section, as a whole, by the reference letter B.

I have specifically indicated the main frame members of lower carrier section A by the reference number 3, and the main frame members of the upper carrier section B by the reference number 4. At its lower end the carrier section A is preferably provided with a shoe 5 and a roller 6, while the upper carrier section B is provided at its upper end with a roller 8 on a shaft 9. An endless carrier belt 7 passes around the rollers 6 and 8 and the upper stretch of this belt serves as an inclined carrier upon which the material delivered to the lower end of the carrier belt by the shoe 5 is carried until it drops off the upper end of the upper section of the carrier.

The frame members 3 and 4 of the lower and upper carrier sections are each, in cross section, in the form of a reversed curve, as illustrated in Figs. 10 and 11 of the drawing, whereby any material that escapes over the edge of the carrier belt 7 drops downward and striking upon the reversed curved surface of the frame members 3 or 4, is carried outwardly away from the carrier and dropped upon the ground, thereby preventing any of the material from falling upon the upper and inner surface of the lower stretch of the carrier-belt, which often happens with ordinary constructions.

A series of supporting rolls 10 are mounted in suitable boxes or bearings secured upon the upper surfaces of the frame members 3 and 4 of the lower and upper carrier sections. These rolls extend across the carrier frame and their upper surfaces support the upper stretch of the carrier belt at suitable intervals, thereby preventing sagging of the belts. These rollers are located any desired distance from one another throughout the length of the carrier frame. As shown in Figs. 10 and 11 of the drawings the edges of the carrier belt 7 may extend laterally a short distance beyond the ends of the roller 10. Each carrier section is provided with side boards or plates 10ª, supported by standards 10ᵇ, secured to the frame members 3 or 4. The lower edge of the side boards or plates 10ª are located as closely as practicable to the upper surface of the carrier belt 7. These side boards keep the main body of the material on the carrier belt 7. Any small amount that works under the lower edges of the side board and falls off from the edge of the carrier belt will, as above stated, strike the outwardly curved surface of the frame members 3 or 4 and fall to the ground therefrom.

Extensions 11 of the frame members 4 of the upper section B of the carrier are provided with longitudinal slots 12 to receive a transverse shaft 13. Pinions 14 are keyed on said shaft and mesh with the teeth of the rack bars 15 formed on said extensions adjacent to the slots 12, said shaft having bearings in brackets 16 and 17 which are provided with slots 18 to receive a flange of the upright angle bars 19 secured to the wheeled frame 2. The lower carrier section A has its frame members 3 provided with reduced extensions 20 from which project arms 21 which engage the shaft 13 between the extensions 11. The arms 21 which project from the extensions 20 of the lower frame members 3, have a casting 20ª secured preferably to their under surface by bolts 20ᵇ and rivets 20ᶜ, thereby forming pockets to receive the arms 21 (see Fig. 10). These arms are held in the pockets and are secured to the frame members 3 by bolts 21ª which pass through a hole in said arms and through any one of a series of holes 21ᵇ in said frame members 3. A worm wheel 22 is secured on the shaft 13 and meshes with a worm 23 that is mounted on a shaft 24 having bearings in bracket 25 and extends upwardly to a point above the carrier and is journaled in a bearing 25′ that is secured to an upright bar 26 of said wheeled frame. A pinion 27 is mounted on the shaft 24 and meshes with a pinion 28 on a shaft 29 having bearings 30 on the bars 26 and extending transversely of the carrier parallel with the shaft 13. On this shaft 29 an operating wheel 31 is secured. A notched disk 32 is also secured on the shaft 29 and a dog 33 is pivoted on one of the bearings 30 on the bar 26 in position to enter the notches in the disk 32 and lock the shaft 29 and the wheel against movement in either direction. When this dog is disengaged from the notches in the disk the wheel may be revolved to operate the shaft 24 and move the carrier section B back and forth on the shaft 13 to straighten the apron or take up any slack therein, or loosen it if it is stretched to a greater degree than desired. A couple of sheaves 34 are loosely mounted on the frame to guide lifting chains 35 and similar chains 36 are connected to the shaft 13 and pass over the loose sheaves 37 and extend to a suitable operating shaft for raising and lowering the frame of the carrier to change its elevation or inclination with respect to the ground line. The outer end of the carrier is also preferably provided with suitable raising and lowering means. I make no claim to these features in this application and detailed description and illustration is unnecessary.

At the upper end of the carrier section 4 I provide a means for shifting the belt roller, moving it up and down in the frame to maintain its parallel relation with the lower roller and compensate for any unevenness in wear and provide for a more even or smooth running of the carrier belt. With this end in view I provide openings 38 in extensions to the main members of carrier frame section 4 having flanged guides 39 thereon to receive webs 40 formed on the boxes 41 on the roller 8. These boxes have key-seats 42 therein to receive lugs 43 formed on a strap 44 which encircles the boxes and strap 9 and straddles the frame 45. Said frame is provided with ribs 46 to enter notches 47 in the lugs 48 on the frame members. These lugs 48 have holes therein to receive the ends of bolts 49, the heads of said bolts bearing on the ends of the frame 45. Nuts 50 are mounted on said bolts and are seated against the lugs 48 and by the adjustment of these nuts the frame 45 may be moved back and forth to adjust the straps 44 and with them the roller boxes in the guides 39, thereby adjusting the apron to insure its uniform operation to compensate for wear in the bearings of the roller.

With this construction the lower carrier section may be adjusted relatively to the shaft 13 by sliding said section upward or from the plow or disk by which the material is loaded onto the carrier. To make this adjustment the bolts 21ª are removed and the frame members 3 are moved relatively to the arms 21 and the said bolts are re-inserted in other holes 21ᵇ in said frame members.

Having once properly adjusted the shoe 5 and the lower end of the carrier section A in respect to the loading plow or disk, the relation between these parts will not usually require any change. If, however, for any reason any change is desired the same may be secured by changing the relative position of the frame members 3 and arms 21 by means of the bolts 21ª and the holes 21ᵇ.

The lower end of the lower carrier section may be raised or lowered by means of the chain 35 so as to bring this end of the lower section into any desired position in respect to the surface of the ground. The upper end of the upper section may also be raised or lowered thereby increasing or decreasing the inclination of the upper section of the carrier. The upper end of the lower carrier section and the lower end of the upper carrier section are adjusted simultaneously either up or down by the chain 36 and the devices to which said chain is connected. I prefer to employ a well-known wheel, shaft and ratchet device 36' connected with the chains 35 and 36 and with the bail 36'' at the upper end of the carrier.

By these three adjusting means the carrier may be given any desired inclination and the upper and lower sections may be given different inclinations. For instance, the lower carrier section may be set at a steep incline, while the upper carrier section is horizontal or nearly so.

To cause the carrier belt to run straight the upper roll 8 is arranged so that either supporting box or bearing may be independently adjusted lengthwise of the carrier, and for the purpose of tightening the belt or taking up the slack there, if the same is too loose, the mechanism already described connected with the shaft 24 and operated by the wheel 21 may be employed, or the same mechanism may be employed to shorten the carrier if for any reason the belt is found to be too tight. All of these adjustments may be secured by an operator standing on the machine platform.

I do not limit myself to the details of construction as the same may be varied in many particulars without departing from my invention.

I claim as my invention:

1. In a machine of the class described, the combination, with a frame provided with upright standards, of an elevating carrier frame comprising upper and lower sections, a carrier belt mounted thereon, a shaft connecting the ends of said section, and whereon one of said sections is longitudinally movable, bearings, in which said shaft is mounted, adjustably supported upon said standards, means for raising and lowering said bearings and the shaft carried thereby, and means for operating said shaft to effect a longitudinal adjustment of one of said sections.

2. In a machine of the class described, the combination, with a frame, provided with upright standards, of an elevating carrier frame comprising upper and lower sections, a carrier belt mounted thereon, a shaft connecting the ends of said sections, and whereon one of said sections is longitudinally movable, said shaft forming also pivotal supports for said carrier frame sections, bearings, in which said shaft is mounted, adjustably supported upon said standards, means for raising and lowering said bearings and the shaft carried thereby, means for operating said shaft to effect a longitudinal adjustment of one of said sections, and means for adjusting either section of said carrier frame, upon its pivotal support, to vary its inclination.

3. In a machine of the class described, the combination, with a frame provided with upright standards, of an elevating carrier frame, comprising upper and lower sections, one of said sections being adjustable longitudinally in respect to the other, means provided upon said standards and adjustable thereon, forming a pivotal support for said carrier frame, means for raising and lowering said pivotal support, means connected with the pivot of said carrier frame for longitudinally adjusting one of the carrier sections with respect to the other, and means for changing the inclination of either section of said carrier frame upon its pivotal support.

4. In a machine of the class described, the combination, with a frame provided with upright standards, of an elevating carrier frame comprising upper and lower sections, adjustably and pivotally supported upon said standards, means provided upon said pivotal support for moving one of said sections longitudinally with respect to the other, means for raising and lowering the pivotal support of said carrier frame, and means for varying the inclination of either section of said carrier frame upon its pivotal support.

5. An elevating grader carrier frame comprising upper and lower sections, hinged together, a shaft connecting the abutting ends of said sections and whereon one of said sections is longitudinally movable, bearings for said shaft, bars whereon said bearings are vertically slidable, means for raising and lowering said shaft and bearings, and means for revolving said shaft to effect a longitudinal adjustment of one of said sections.

In witness whereof, I have hereunto set my hand this 24th day of August 1915.

AXEL ANDERSON.

Witness:
ESTHER LINDSTEDT.